United States Patent [19]
Huang

[11] Patent Number: 5,541,646
[45] Date of Patent: Jul. 30, 1996

[54] DISPLAY IMAGE STABILIZATION APPARATUS AND METHOD OF USING SAME

[75] Inventor: Chen Huang, San Diego, Calif.

[73] Assignee: Proxima Corporation, San Diego, Calif.

[21] Appl. No.: 378,045

[22] Filed: Jan. 24, 1995

[51] Int. Cl.$^6$ .................................................. H04N 17/04
[52] U.S. Cl. ........................... 348/177; 348/511; 348/189
[58] Field of Search ...................................... 348/177, 181, 348/183, 189, 188, 511–510, 184; 345/199, 153; H04N 17/24

[56] References Cited

U.S. PATENT DOCUMENTS 4,513,318 4/1985 Wilensky et al. ........................ 348/181

Primary Examiner—Victor R. Kostak
Attorney, Agent, or Firm—Bernard L. Kleinke; Jerry R. Potts; Peter P. Scott

[57] ABSTRACT

The display device image stabilization apparatus is utilized in a display system having a frame buffer coupled to a display device. The apparatus includes a sampling arrangement coupled to the frame buffer for sampling input video data to generate a display signal, wherein the display signal is stored temporarily in the frame buffer as buffer information. A control device is coupled to the frame buffer for comparing the buffer information with reference information to determine whether the buffer information and the reference information are similar to one another. The control device generates a gain adjustment signal when the buffer information and the reference information are different from one another. Coupled between the control device and the sampling arrangement is a phase lock loop circuit for varying the display signal in response to the gain adjustment signal. The buffer information is updated continuously until it is substantially similar to the reference information, and the display image has been stabilized.

20 Claims, 5 Drawing Sheets

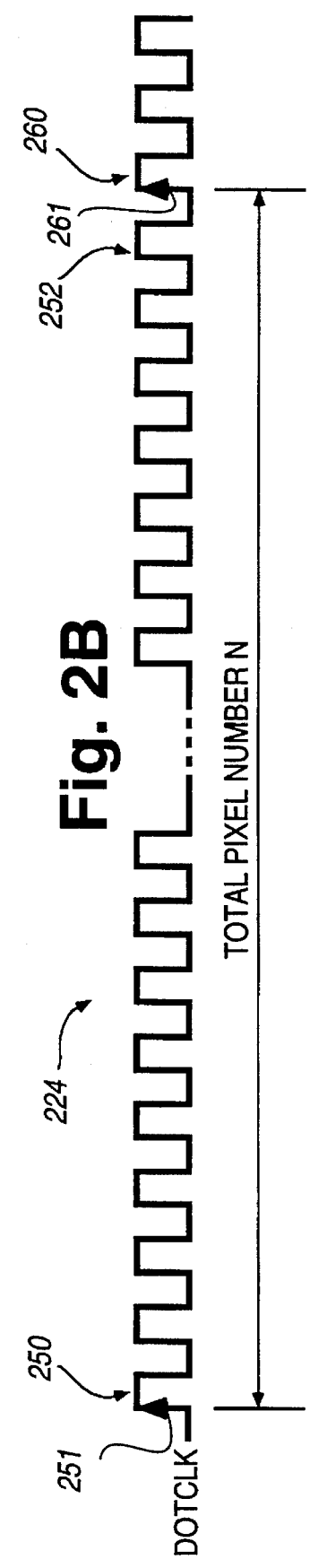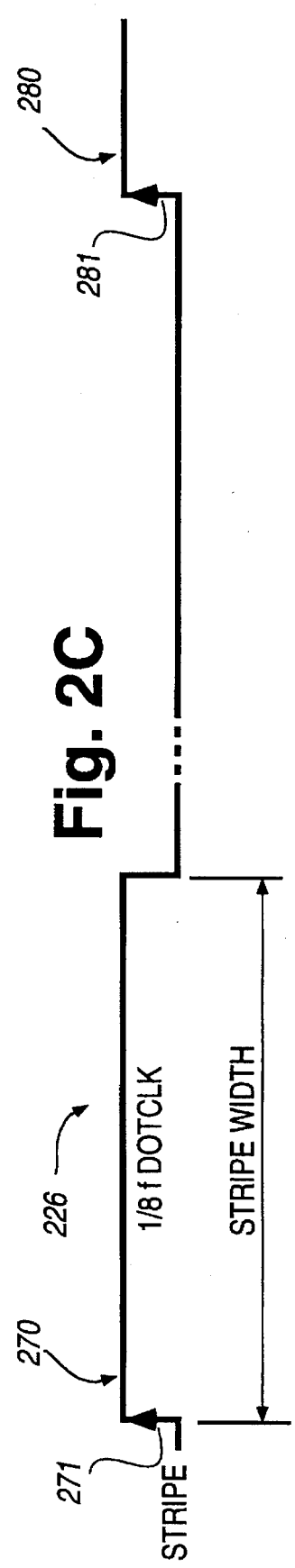

DISPLAY IMAGE STABILIZATION APPARATUS AND METHOD OF USING SAME

TECHNICAL FIELD

The present invention relates in general to an improved display device image stabilizing apparatus and a method of using it. The invention more particularly relates to a stabilizing apparatus which may be used to eliminate distortion in an image displayed on a display device, such as a liquid crystal display, and which can be used according to a novel method.

BACKGROUND ART

Display devices, such as liquid crystal displays (LCD) and cathode ray tubes (CRT), have been widely used to display various images represented by digital data. In this regard, analog data which has been converted into digital information, or information which was originally generated as digital information, can be readily displayed on an LCD or a CRT display by providing a horizontal synchronization signal at the beginning of each row of pixel information, and subsequently providing pixel information for each pixel in a row. Following the last pixel for a given row, a new horizontal synchronization signal is initiated to begin sending new pixel information to the next row. This pattern is repeated until the entire display has been created, and then the process begins again in the next frame in the process of generating a display image.

In order to produce a sharp image on the display, it is imperative that the horizontal synchronization signal for each row is properly synchronized with the horizontal synchronization signal for that row. Should the first portion of pixel information not coincide precisely with the horizontal synchronization signal, the subsequent portions of pixel information cannot be supplied to the pixel elements in the proper manner prior to the next row's horizontal synchronization signal being received. As a result, the pixel information becomes shifted in time, causing unwanted distortions in the displayed image. In the situation where the first portion of pixel information does coincide precisely with the horizontal synchronization signal, but the number of portions of pixel information which are supplied to the display do not correspond to the number of pixel elements in the row, the display is again distorted due to the subsequent horizontal sync signal failing to correspond with the beginning of the following row.

In an attempt to overcome the problem of image distortion due to either the horizontal synchronization signal failing to correspond with the first portion of pixel information or the number of portions of pixel information not corresponding with the number of pixel elements in a row, a phase locked loop (PLL) has been employed to enable a pixel clock to be precisely matched in frequency and phase with the horizontal synchronization signal. In this manner, the first portion of pixel information coincides with the horizontal synchronization signal, and the total number of portions of pixel information supplied are appropriate for the number of pixel elements in a given row. In order to match the frequency and phase of the pixel clock and the horizontal synchronization signal, two gain values are required to be set for the PLL. The first gain value that is required to be set is the phase detector gain (PDG), while the other gain which is required to be set is the voltage controlled oscillator gain (VCO). The total closed loop gain of the PLL is simply the PDG multiplied by the VCO gain.

The correct closed loop gain for synchronizing properly the pixel clock with the horizontal synchronization signal depends upon manufacturers, including the input/output frequency ratio, the loop filter parameters, and also upon environmental noise. In fact, there are so many different factors that can adversely affect the operation of the PLL circuit, that two PLL circuits of the same design may have slightly different gain values for a similar graphics mode to enable the pixel clock to be synchronized with the horizontal synchronization signal.

In the past, a specific closed loop gain value was passively preset for each graphics mode. However, the initial preset closed loop gain value frequently, if not always, become inadequate for proper synchronization over time. As a result, it becomes necessary for the user to adjust the gain value as required. Due to the numerous possible combinations of gain values, the adjustment of the entire closed loop gain results in confusion and inconvenience for the user.

Therefore, it would be highly desirable to have a new and improved display device image stabilization apparatus, which helps maintain the desired synchronization of pixel information driving a display unit for various graphic modes. Such a new and improved system should overcome the problems associated with the inconvenience of requiring the user to make repeated and unwanted adjustments to maintain the desired stability of the system. Such a display device image stabilization arrangement should operate automatically, or at least require little intervention by the user.

DISCLOSURE OF INVENTION

Therefore, the principal object of the present invention is to provide a new and improved display image stabilization apparatus and a method of using it, wherein the apparatus does not require extensive user input.

Briefly, the above and further objects of the present invention are realized by providing a new and improved display device image stabilization apparatus, which is used according to a novel method of the present invention.

The display device image stabilization apparatus is utilized in a display system having a frame buffer coupled to a display device. The apparatus includes a sampling means coupling to the frame buffer for sampling input video data to generate a display signal, wherein the display signal is stored temporarily in the frame buffer as buffer information. A control device is coupled to the frame buffer for comparing the buffer information with reference information to determine whether the buffer information and the reference information are similar to one another, wherein the control device generates a stabilization adjustment signal when the buffer information and the reference information are different from one another. A phase lock loop circuit affects the video signal sampling and, therefore, varies the display signal in response to the stabilization adjustment signal. The buffer information is updated continuously until it is substantially similar to the reference information, and the display image has been stabilized.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 2A is a timing diagram of the horizontal synchronization signal;

FIG. 2B is a timing diagram of a dot clock signal;

FIG. 2C is a timing diagram of a stripe signal;

BEST MODE FOR CARRYING OUT INVENTION

Figure 1:
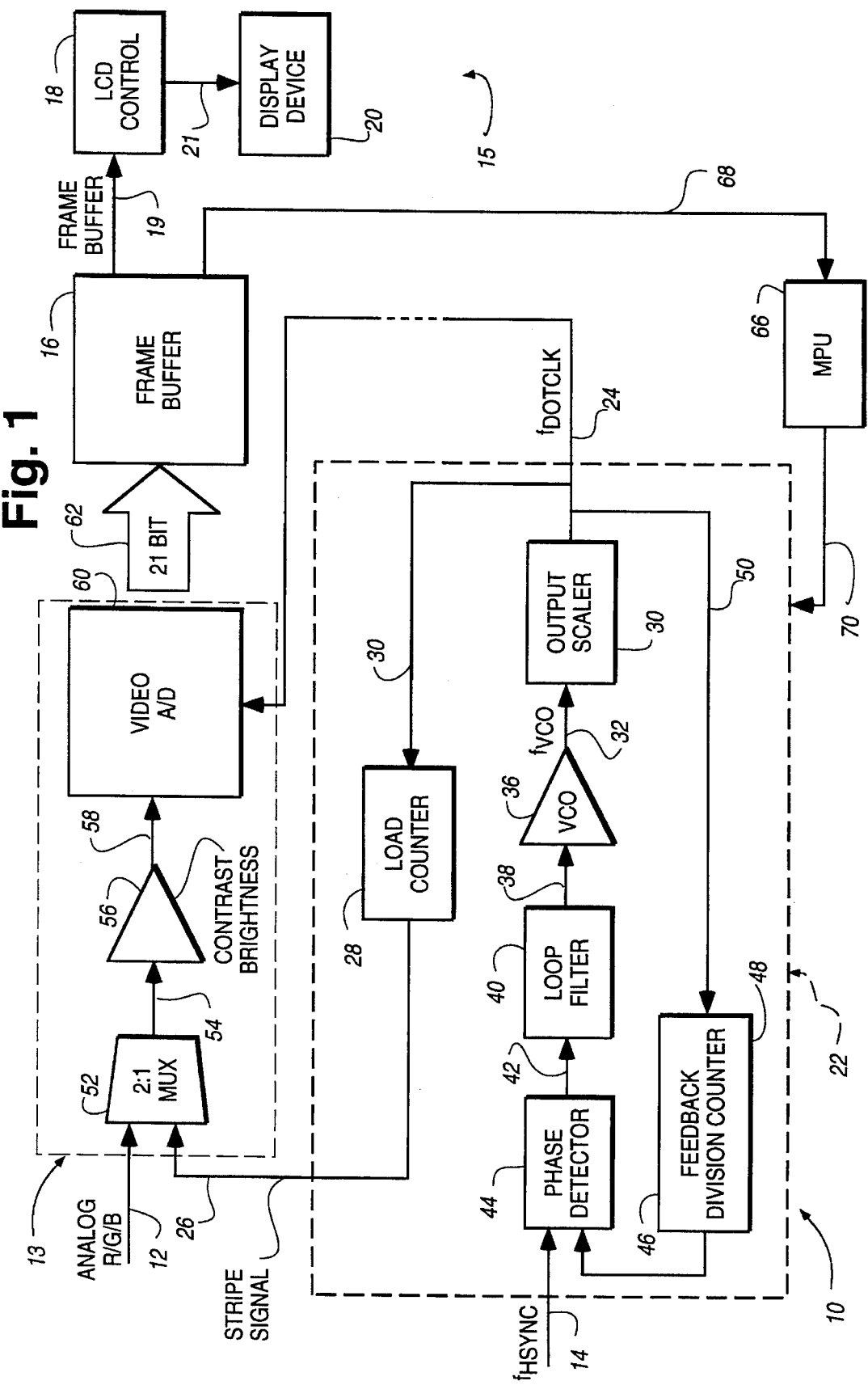
FIG. 1 is a block diagram of a display device image stabilization apparatus, which is constructed in accordance with the present invention.

Referring now to the drawings, and more particularly to FIG. 1 thereof, there is shown an image stabilization apparatus 10, which is constructed in accordance with the present invention. The apparatus 10 can be easily used in accordance with the method of the present invention.

The apparatus 10 cooperates with an image display system 15 to display a stabilized image. The display system 15 includes a frame buffer 16 to temporarily store buffer information indicative of the image to be displayed. The display system 15 further includes a liquid crystal display (LCD) control 18 to read out the buffer information as buffer signal 19, and subsequently direct the buffer information to a display device 20 as display device signal 21, wherein the buffer information is displayed as the image.

The buffer information is generated from an analog signal 12 which includes pixel information indicative of the image that is to be displayed on display device 20. The analog signal 12 is formatted to display the buffer information on display device 20 according to a particular graphics mode, represented as N×M, where N is the number of displayed pixels per row and M is the number of displayed rows. Examples of such graphics modes or pixel matrix resolution are 640×480 and 1280×1024.

In order for the buffer information to be stored properly in the frame buffer 16 and be displayed on display device 20, a horizontal synchronization (HSYNC) signal, such as HSYNC signal 14, is required to indicate the beginning of each horizontal row of pixels for m rows. During each row, a dot clock (DOTCLK) signal, such as DOTCLK signal 24, is required to indicate each pixel element of the row. In the full speed sampling mode, the DOTCLK signal includes one clock pulse for every n pixels. Furthermore, the leading edge of the HSYNC signal 14 must correspond as close as possible, if not exactly, with the leading edge of the first DOTCLK signal 24 pulse to achieve the desired accuracy. In this way, the buffer information will be stored in the frame buffer 16 such that all the pixels in each row will be properly aligned with corresponding pixels in adjacent rows, thereby enabling the buffer information to be displayed as a stabilized image on display device 20.

Referring now to FIGS. 2A and 2B, there are shown an HSYNC signal 214 and a DOTCLK signal 224, respectively.

The HSYNC signal 214 includes two pulses, 216 and 218, having leading edges 217 and 219, wherein the leading edges 217 and 219, coincide with the beginning of a new horizontal row of pixels.

The DOTCLK signal 224 includes N pixels for each M row of pixels. In this regard, pulse 250 having a leading edge 251 represents the first pixel of the row and pulse 252 is the Nth pixel of the row, while pulse 260 having a leading edge 261 represents the first pixel of the following row. As described previously, it is necessary that the leading edges 217 and 219 of the HSYNC signal pulses 216 and 218 correspond with the leading edges 251 and 261 of the pulses 250 and 260. In this way, each row of pixels will be vertically aligned with one another. In the event that the leading edges 217, 219, 251 and 261 are not properly aligned, the image displayed on display device 20 will not be stable.

Figure 5:
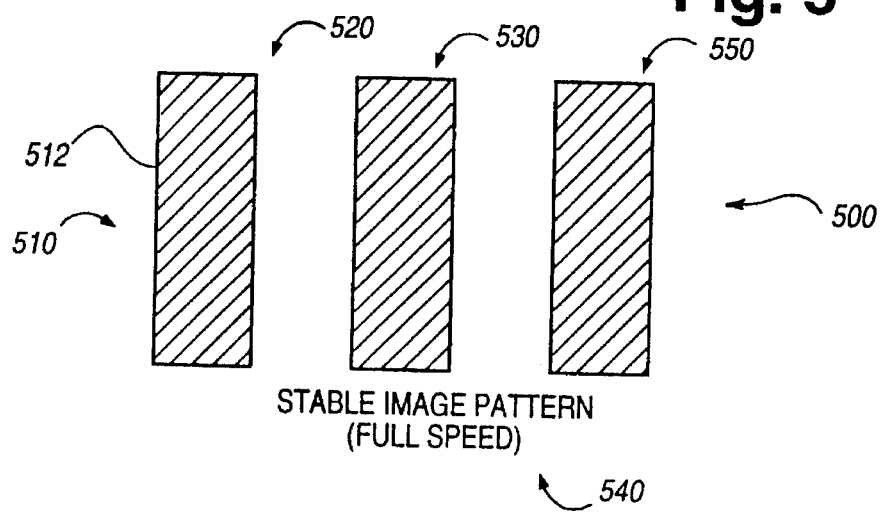
FIG. 5 is a stabilized test pattern image displayed by a display device.
Figure 6:
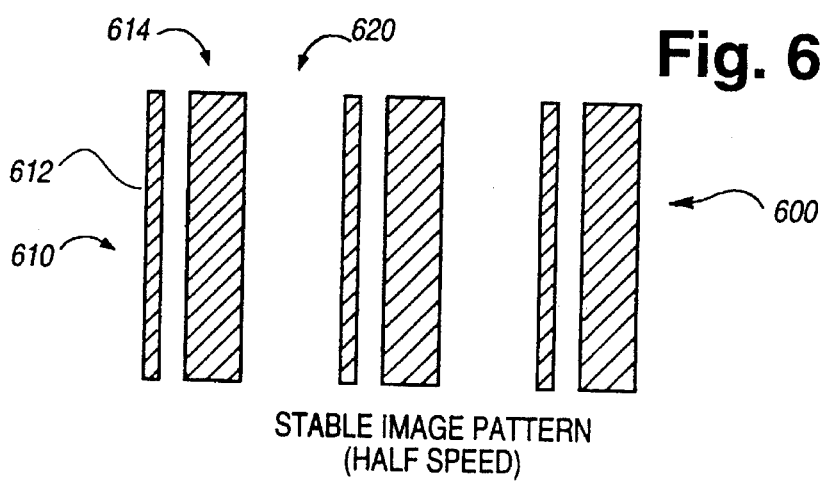
FIG. 6 is an undesired test pattern image displayed by a display deuce.
Figure 7:
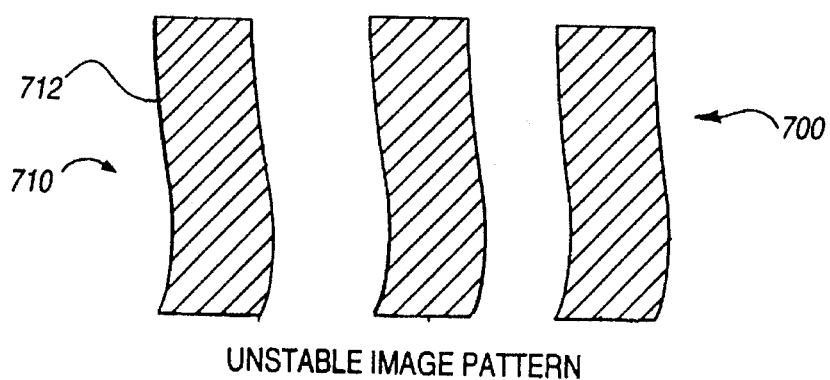
FIG. 7 is another unstable test pattern image displayed by a display device.

Referring now to FIGS. 5, 6 and 7, there is shown in FIG. 5 a stabilized image representative of a striped test pattern 500. The pattern 500 includes vertical stripes 510, 520, 530, 540 and 550, wherein stripes 510, 530 and 550 are "on" while stripes 520 and 540 are "off". The resulting pattern 500 is stabilized in that all N pixels of each row that form the stripes 510, 520, 530, 540 and 550 are repeated precisely for each adjacent row for M rows. In addition, the leading edges of the first DOTCLK pulse for each row is synchronized with the leading edges of the rows' HSYNC pulse to ensure that the stripes 510, 520, 530, 540 and 550 are vertical and have precise vertical edges, such as edge 512 of stripe 510.

As will be described hereinafter in greater detail, a phase detector gain and a voltage-controlled oscillator (VCO) gain must be adjusted to facilitate the generation of a stabilized image, such as pattern 500. When the pattern 500 is stabilized, the phase detector gain and the VCO gain have been properly adjusted.

An image is shown in FIG. 6 that is representative of a striped test pattern 600 in a half speed sampling mode. This test pattern 600 is similar to the pattern 500 of FIG. 5, except that the even and odd pixels are swapped. It should be understood that the pattern 600 results even where the phase lock loop circuit 22 is stabilized. In this regard, the pattern 600 includes alternating vertical on and off stripes, such as stripes 610 and 620. The vertical edges of the stripes 610 and 620, such as edge 612 (1 pixel wide) of stripe 610, are precisely vertical, indicating that first DOTCLK pulse of each row is synchronized with the respective row's HSYNC pulse. However, each on stripe of the pattern 600 includes a vertical off stripe, such as stripe 614 (1 pixel wide). In the half speed sampling mode, every one of the DOTCLK signal 24 pulses matches two pixels. Therefore, the even/odd pixels are sampled alternatively by the DOTCLK signal 24 pulse. However, if the DOTCLK signal 24 phase is reversed from the original pixel signal phase, the sequence of the sampled even/odd pixels in the frame buffer 16 will be swapped to odd/even. As a result of the swapped pixels, the pattern 600 shown as FIG. 6 will be displayed. This pattern 600 is undesirable because the user will see irregular lines and unreadable fonts.

When the control unit 66 identifies the pattern 600, it generates an adjustment signal 70 to reverse the DOTCLK signal 24 pulse phase. Once the DOTCLK signal 24 phase matches the pixel phase, the pattern will be in a preferred form as shown as the pattern 500 in FIG. 5. Then the user sees a stable image.

A striped pattern 700 of FIG. 7 includes alternating stripes, such as stripe 710 for a situation where the phase lock loop circuit 22 is unstable. Unlike the patterns 500 and 600, both the phase detector gain and the VCO gain are incorrectly adjusted, causing the pattern 700 to be distorted and unstable. In this regard, edge 712 is not precisely vertical as is desired.

In order to stabilize the image displayed on display device 20 of FIG. 1, the apparatus 10 generally comprises a sampling circuit 13 coupled to the frame buffer 15 for sampling the analog signal 12 to generate a display signal 62. The display signal 62 is stored temporarily in the frame buffer 16 as the buffer information.

Coupled to the frame buffer is a microprocessor control unit (MPU) 66. The MPU 66 accesses the buffer information and monitors it for a pattern judgment, or comparison, via input signal 68. The pattern judgment performed by MPU 66 compares the buffer information stored in the frame buffer 16 with reference information to determine whether the buffer information and the reference information are identical to one another. More specifically, the buffer information is sampled beginning at the upper left corner of the information to make a pattern judgment based on the reference information. The MPU 66 develops a stabilization or gain adjustment signal 70 as a result of the pattern judgment. In the preferred embodiment, the MPU 66 is a 68331 microprocessor as manufactured by Motorola.

Disposed between the MPU 66 and the sampling circuit 13 is a phase locked loop (PLL) circuit 22. The PLL circuit 22 is responsive to the stabilization adjustment signal 70 and to the HSYNC signal 14 to generate the DOTCLK signal 24. The PLL circuit 22 also selectively generates a stripe signal 26 to facilitate the pattern judgment operation of the MPU 66, wherein the stripe signal 26 produces buffer information according to a specific pattern. This enables the buffer information to be compared and updated until the buffer information is substantially similar to the reference information.

In the preferred embodiment of the present invention, the stripe signal 26 produces buffer information comprised of alternating on and off vertical stripes of equal width. For example, the first vertical stripe is preferably an on stripe having a width of 8 pixels, followed by a second vertical off stripe also having a width of 8 pixels. This alternating pattern is continued for all N pixels of each row to form an n×m pattern of alternating vertical on and off stripes.

The use of stripes having a width of 8 pixels is preferred because N is an even integer for all graphics modes, and is also a multiple of 8 for most graphics modes. For graphics modes that are not a multiple of 8, the number of pixels N can be artificially modified until the modified number of pixels N' is a multiple of 8. In this way, the alternating vertical stripe pattern for each row will always correspond with the number of modified pixels N', and the first on stripe of each row will always correspond with the first on stripe of each adjacent row. The result, when the image is stable, is a pattern of vertical alternating on and off stripes whose edges are aligned from row to row.

Referring now to FIGS. 2A, 2B and 2C, the coordination of the HSYNC signal 214, the DOTCLK signal 224, and a stripe signal 226 can be seen. Stripe signal 226 is shown as having N pixels based on a comparison with FIG. 2B. However, it could also have modified N' pixels and still function to generate a proper test pattern. The stripe signal 226 includes a pulse 270 having a leading edge 271 and another pulse 280 having a leading edge 281. Pulse 270 represents the first vertical on stripe for the row while pulse 280 represents the first vertical on stripe for the next subsequent row. The stripe signal 226 is representative of a stabilized test pattern, wherein leading edge 271 corresponds precisely with leading edges 217 and 251, and leading edge 281 corresponds precisely with leading edges 219 and 252.

In operation, with reference to FIG. 1, the analog signal 12 is sampled by the sampling circuit 13 to generate the display signal 62. The display signal 62 is stored temporarily in the frame buffer 16 as buffer information. The buffer information is retrieved by the LCD control 18 as buffer signal 19, and the buffer information is subsequently transmitted to the display device 20 as display device signal 21 for displaying an image.

The PLL circuit 22 receives the HSYNC signal 14 and generates the DOTCLK signal 24 in response thereto for enabling the sampling circuit 13 to generate the display signal 62, wherein the buffer information is synchronized with the HSYNC signal 14. During periods when the buffer information may be out of synchronization with the HSYNC signal 14, such as during an initialization operation or when the DOTCLK signal 24 is adjusted by a user, the PLL circuit 22 becomes unstable. As will be described hereinafter in greater detail, the PLL circuit 22 cooperates with the MPU 66 to return the PLL circuit 22 to a stable state.

During an initialization operation, or when the user adjusts the DOTCLK signal 24, the PLL circuit 22 generates the stripe signal 26 to produce test information representative of a test pattern. The test information is transmitted to the frame buffer 16 and stored temporarily therein as buffer information.

The buffer information is compared with the reference information by the MPU 66. In this regard, the MPU 66 performs a pattern judgment to determine whether the buffer information and the reference information are similar to one another. In the event that the buffer information and the reference information are different from one another, the MPU 66 generates a stabilization adjustment signal 70, which is transmitted to the PPL circuit 22.

Upon receiving the stabilization adjustment signal 70 from the MPU 66, the PLL circuit 22 adjusts the DOTCLK signal 24 and the stripe signal 26 to vary the display signal 62. The PLL circuit 22 continues to vary the display signal 62 in response to receiving the stabilization adjustment signal 70 until such time as the buffer information and the reference information are similar to one another.

In this regard, the apparatus 10 is a closed loop feedback system for enabling the buffer information to be continually updated until it matches the desired reference information. Any difference between the buffer information and the reference information generates an error signal, i.e., the stabilization adjustment signal 70, which slightly alters the buffer information. The process is repeated until there is no change in the stabilization adjustment signal 70. The feedback circuit is substantially stabilized and the buffer information is correctly synchronized with regard to the HSYNC signal 14, the DOTCLK signal 24, and the stripe signal 26. Once the feedback circuit is stabilized, the stabilization adjustment signal 70 remains constant and the generation of the stripe signal 26 is terminated.

Considering now the sampling circuit 13 in greater detail with reference to FIG. 1, the display signal 62 is generated by an A/D converter 60. The A/D converter 60 samples an adjusted analog signal 58 according to the DOTCLK signal 24, resulting in the display signal 62. A contrast/brightness device 56 receives a multiplexed signal 54 and adjusts it to enhance the contrast and brightness image qualities of the multiplexed signal 54, thereby producing the adjusted signal 58. According to the present invention, the analog signal 12 and the stripe signal 26 cooperate with a multiplexor 52 to produce the multiplexed signal 54.

In operation, the analog signal 12 is multiplexed with the stripe signal 26 to produce information indicative of a pattern whose characteristics are determined by the stripe signal 26, wherein the multiplexed signal 54 is produced. As described previously, in the preferred embodiment, the analog signal 12 is multiplexed with the stripe signal 26 to produce information indicative of an alternating vertical on and off striped pattern.

The multiplex signal 54 is adjusted by the contrast/ brightness device 56 to enhance the multiplexed signal 54 for facilitating the viewing of the display image on the display device 20. The adjusted signal 58 is then sampled by the A/D converter 60 according to the DOTCLK signal 24 to generate the display signal 62. The frame buffer 16 receives the display signal 62 and stores it therein as buffer information. Where the stripe signal 26 is producing the striped pattern information, the buffer information is indicative of a test pattern.

Figure 3:
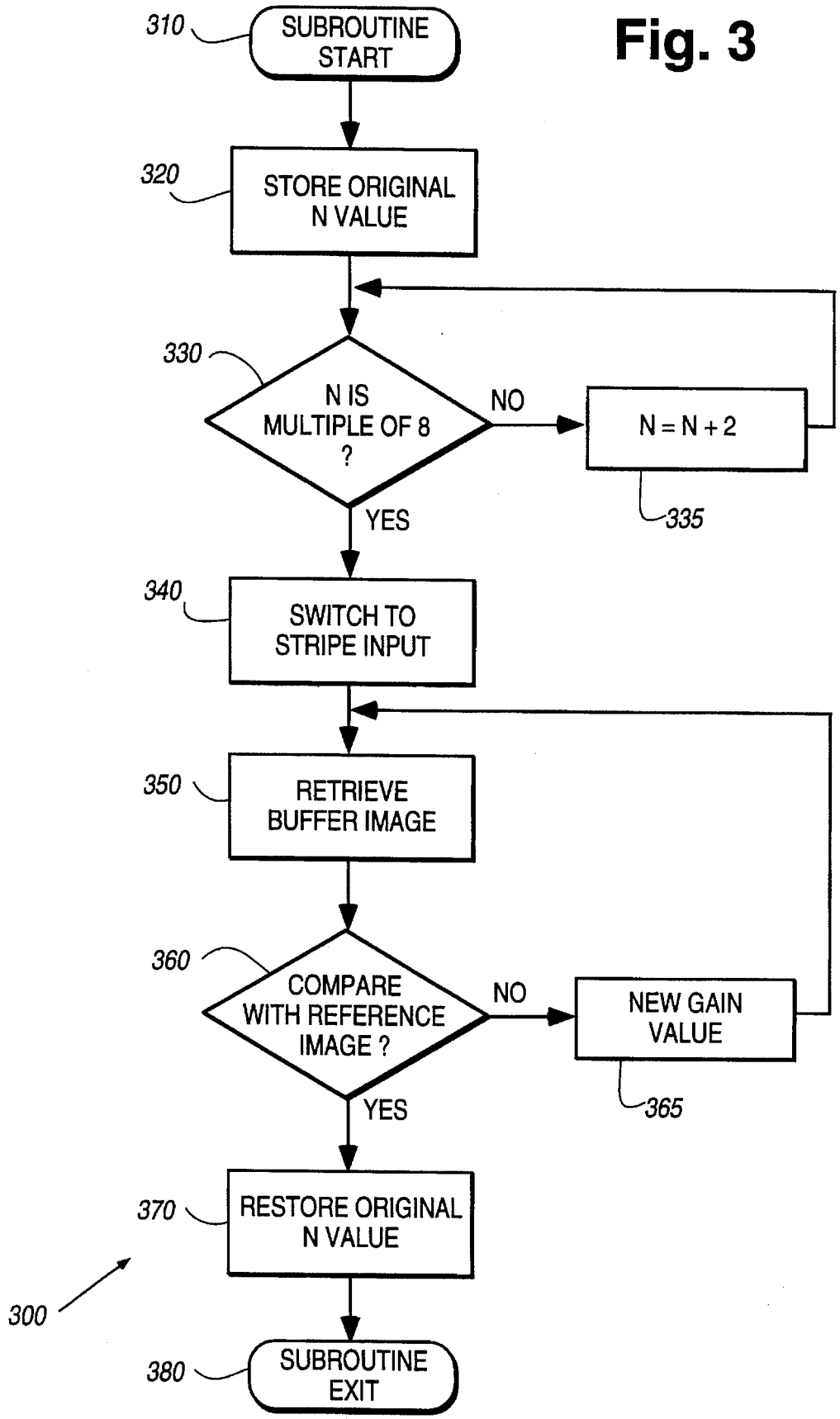
FIG. 3 is a flowchart of a pattern judgment algorithm used in the display device image stabilization apparatus of the present invention.
Figure 4:
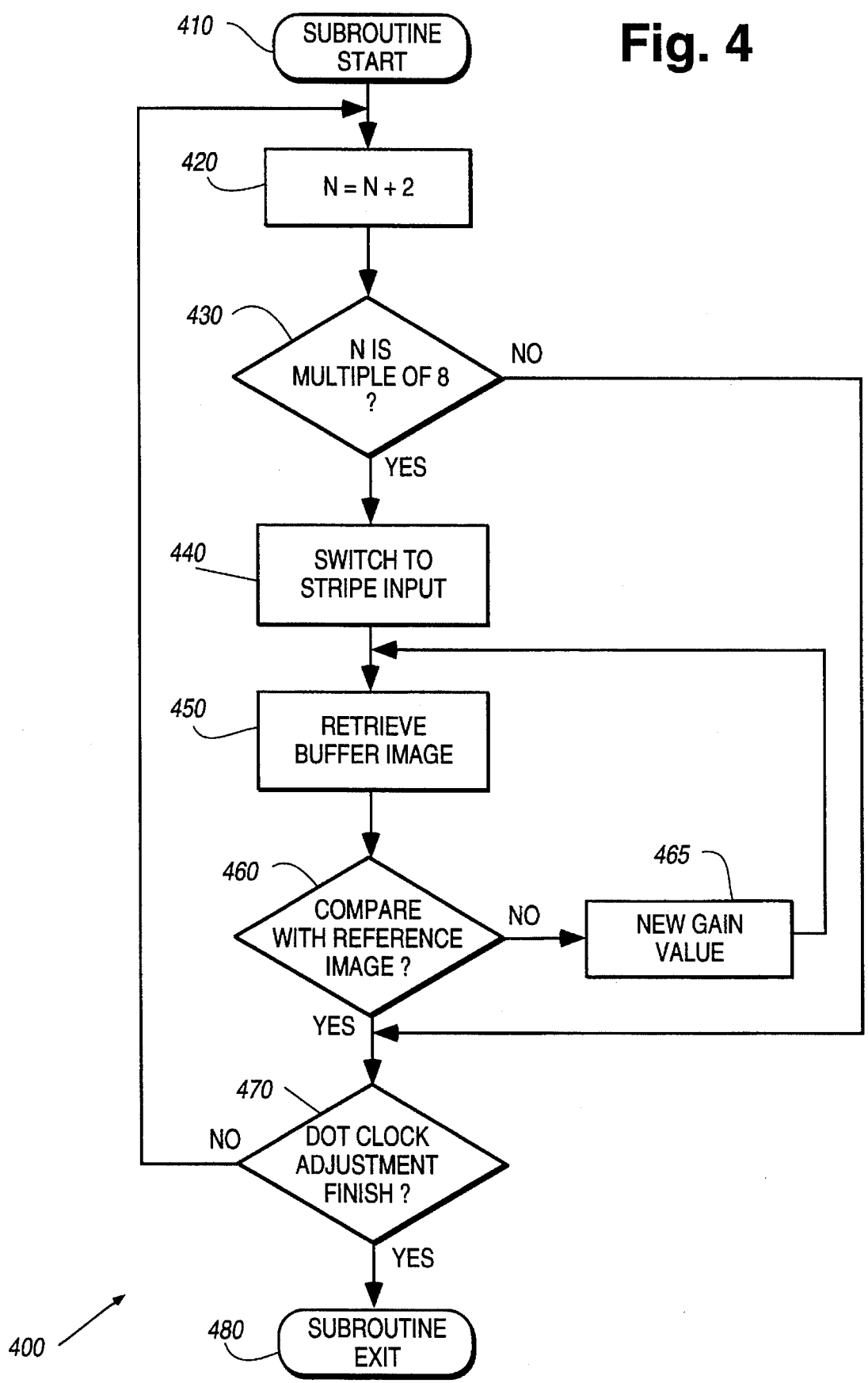
FIG. 4 is a flowchart for another pattern judgment algorithm used in the present invention.

Considering now the MPU 66 in greater detail with reference to FIGS. 1, 3 and 4, the MPU 66 includes software for comparing the buffer information with the reference information, and for generating a new stabilization adjustment signal 70 where the buffer information and the reference information are different from one another.

The pattern judgment performed by the MPU 66 is dependent upon the graphics mode of the analog signal 12. For graphics modes where N is a multiple of 8, the pattern judgment performed by the MPU 66 can be performed directly.

For graphics modes where N is not a multiple of 8, the value of N, preferably, must be modified until the modified value N' is the next closest multiple of 8. For instance, if N=12, then the preferred modified value N' is 16. After the pattern judgment has been performed and the displayed image is stabilized, the original value of N is restored.

Although the pattern judgment may not be performed at the original value of N, the effect caused by the change in the value of N is slight, and is unlikely to affect the existing stability status. In this regard, a change in the value of N of +6 at NTSC graphics mode results in a change to N of about 1%. Similarly, a change of +6 in the 1280×1024 graphics mode results in a change to N of about 0.4%.

The operation of the MPU 66 during an initialization operation is shown generally by algorithm 300 of FIG. 3. However, the user may be presented subsequent to the initialization procedure with a DOTCLK adjustment menu for performing DOTCLK adjustments where the graphics mode presently in use can be changed to another graphics mode. In this regard, algorithm 400 of FIG. 4 is representative of such a situation.

Considering now algorithm 300 in greater detail with regard to FIG. 3, the algorithm 300 is initiated at a subroutine start block 310. The original horizontal pixel value N is then stored according to block 320. The value N is then analyzed to determine if it is a multiple of 8 at decision block 330. If the value N is not a multiple of 8, the value of N is incremented by +2 at block 335. The adjusted value for N is then compared again at decision block 330 to determine whether N is a multiple of 8 yet. In the event that N is still not a multiple of 8, the value N is incremented by +2 again until N is a multiple of 8. It will be understood by one skilled in the art that modifying N by +2 is only a preferred method.

N could be modified instead by −2, or by any other similar method. As will be described hereinafter in greater detail, the value of N is supplied to the PLL circuit 22 together with the stabilization adjustment signal indicated at 70.

Upon the event that N is a multiple of 8, the stripe signal 26 generation is initiated at block 340. After the stripe signal 26 has been initiated, the buffer information indicative of a buffer image as stored in the frame buffer 16 is retrieved at block 350. As the stripe signal 26 is now active, the buffer information is now in the form of test information indicative of a test pattern. The buffer information is then compared with reference information at decision block 360, wherein a pattern judgment is performed. Where the buffer information and the reference information are not substantially similar to one another, a new gain value for adjusting the stabilization adjustment signal 70 is selected at block 365. New buffer information is then retrieved at block 350 for comparison with the reference information at decision block 360.

Considering now the new gain value block 365 in greater detail, the block 365 selects new stabilization adjustment signal values in an iterative fashion according to the DATA BITS column of Table 1 below. Preferably, the PLL circuit 22 is an ICS 1522 user-programmable video clock generator/line-locked clock regenerator. The corresponding gain values for ICS 1522 are shown below. The gain values of Table 1 represent the total closed loop gain which is substantially equal to the phase detector gain multiplied by the VCO gain.

TABLE 1

| GAIN VALUE REGISTER 4 | DATA BITS | HEXADECIMAL |
|---|---|---|
| 1 | 101 1110 0011 | 5e3 |
| 2 | 101 1110 0100 | 5e4 |
| 3 | 101 1110 0101 | 5e5 |
| 4 | 101 1110 0110 | 5e6 |
| 5 | 101 1110 0111 | 5e7 |
| 6 | 101 1101 0100 | 5d4 |
| 7 | 101 1110 1011 | 5eb |
| 8 | 101 1101 0101 | 5d5 |
| 9 | 101 1101 0110 | 5d6 |
| 10 | 101 1101 0111 | 5d7 |
| 11 | 101 1110 1100 | 5ec |
| 12 | 101 1101 1011 | 5db |
| 13 | 101 1110 1101 | 5ed |
| 14 | 101 1110 1110 | 5ee |
| 15 | 101 1110 1111 | 5ef |
| 16 | 101 1101 1100 | 5dc |
| 17 | 101 1111 0011 | 5f3 |
| 18 | 101 1101 1101 | 5dd |
| 19 | 101 1101 1110 | 5de |

Table 1 represents the order in which the gain values are selected in the left hand column, the binary gain values which are sent as the stabilization adjustment signal 70 to the PLL circuit 22 in the second column, and the hexadecimal equivalent of the gain values of column 2 is represented in column 3.

When viewing the second column of Table 1, it should be understood that the gain value supplied by the microprocessor unit 66 as stabilization adjustment signal 70 to the PLL circuit 22 comprises a total of 15 bits. The least significant four bits have been omitted for representation in column 2 of Table 1 as they represent the read-write bit and the three memory location bits. Thus, the remaining eleven bits are the relevant data bits. Of the data bits shown in column 2, the three least significant bits are representative of the VCO gain while the next three least significant bits are representative of the phase detector gain.

During the initialization of the display system 15, the first gain value from Table 1 is initially selected. The pattern judgment of decision block 360 is subsequently performed. In the event that the buffer information is not stabilized using this initial gain value, the next subsequent gain value, number 2, is selected. New buffer information is retrieved and the pattern judgment is performed again to determine whether the second gain value was sufficient to stabilize the buffer information.

In the event that the buffer information is still not stabilized, a new gain value is selected from the third entry of Table 1. The selection of the next subsequent gain value is repeated until the buffer information is eventually stabilized. The gain value is initially set at its lowest value and is sequentially increased until the proper gain adjustment value is obtained. In this regard, the first gain value of Table 1 represents the smallest closed loop gain and the 19th gain value of the Table represents the largest closed loop gain.

In the event that there is still a difference between the buffer information and the reference information, a new gain value is again selected at block 365. The process of retrieving new buffer information at block 350 and comparing it with the reference information at 360, and selecting a new gain value at block 365 is continued until the pattern judgment performed at decision block 360 results in the determination that the buffer information is similar to the reference information.

Once the pattern judgment performed at decision block 360 indicates that the buffer information and the reference information are similar, and that the buffer information is therefore stable, the original value of N is restored at block 370 before exiting the subroutine at block 380. The original value of N is restored as the pattern judgment has been completed and the need to match the test information with the reference information no longer exists.

Referring now to algorithm 400 of FIG. 4, there is shown an algorithm which is initiated each time a new DOTCLK value is selected by the user. The algorithm begins with the subroutine start box 410 wherein the value N is immediately incremented by 2 at box 420. Decision box 430 determines whether the new value of N is a multiple of 8. If the new value of N is not a multiple of 8, the algorithm proceeds to decision block 470 to determine whether the adjustment of the DOTCLK has been completed. If not, then control is returned to box 420, wherein the value of N is incremented by +2 again. The new value of N is again looked at, at decision box 430, to determine if it is a multiple of 8. If it is not, the preceding steps are repeated until the new value of N is a multiple of 8.

Once N has been adjusted to be a multiple of 8, the algorithm proceeds to box 440, which initiates the stripe input signal 26 to generate the test information, which is then stored in the frame buffer 16 as test information. The test information resulting from the display signal 62 is retrieved from the frame buffer 16 at block 450. The test information is then compared with the reference information at decision block 460, wherein a pattern judgment similar to the pattern judgment performed in algorithm 300 is performed. Should the reference information and the test information differ, a new gain value is selected at block 465, in a similar manner as described previously for algorithm 300. The new gain value is then used to generate new test information which is then retrieved at box 450. The new test information is compared with the reference information at decision box 460, wherein any difference between the two sets of information results in a new gain value being selected at box 465.

The pattern judgment/new gain value/retrieve new test information cycle is continued until such time that the test information is substantially similar to the reference information. When this condition occurs, the algorithm proceeds from decision box 460 to decision box 470 to determine whether the DOTCLK adjustment process is completed.

If the DOTCLK adjustment procedure has not been completed, the algorithm returns to block 420 where the value N is again incremented. The process of setting N to be a multiple of 8, then performing the pattern judgment is again completed until the algorithm returns to the decision box 470 to determine whether the DOTCLK adjustment has been completed. Once the DOTCLK adjustment is completed, the algorithm proceeds to block 480 where the subroutine is exited.

As will be described hereinafter in greater detail, the apparatus 10 is operable in a high speed sampling mode and a half speed sampling mode, depending on the frequency of the DOTCLK signal 24. In this regard, the incrementation of N by +2 in algorithms 300 and 400 is utilized during the high speed sampling mode. For the half speed sampling mode, N will be adjusted by +1 at block 335 of FIG. 3 and block 420 of FIG. 4. It will be understood by one skilled in the art that the modification of N can be accomplished by subtracting 2 in blocks 335 and 420 in full speed sampling mode or by subtracting 1 in blocks 335 and 420 in half speed sampling mode.

Considering now the PLL circuit 22 in greater detail with respect to FIGS. 1, 2A, 2B, and 2C, the PLL circuit 22 is a closed loop feedback system that generates the DOTCLK signal 24 using the HSYNC signal 14 as a reference frequency.

The PLL circuit 22 is responsive to the stabilization adjustment signal 70 to enable the DOTCLK signal 24 to be matched in phase with the HSYNC signal 14, and to ensure that the DOTCLK signal 24 has a frequency corresponding to the number of pixel elements N for the particular graphics mode in use. In addition, the PLL circuit 22 generates the stripe signal 26 for use in generating the buffer information utilized in the pattern judgment performed by the MPU 66.

The PLL circuit 22 includes an output scaler 30 for generating the DOTCLK signal 24. The output scaler 30 has an associated scaling factor for adjusting the frequency of the DOTCLK signal 24 according to the sampling speed, full speed or half speed. In this regard, the scaling factor value is selected to be about unity for full speed sampling mode and about ½ for half speed sampling mode.

To enhance the operation of the PLL circuit 22, it is contemplated that two sampling speeds be utilized according to the DOTCLK frequency of the particular graphics mode in use. In this regard, full speed sampling is appropriate for graphics modes with DOTCLK frequencies under about 70 megahertz if the circuit design uses a 70 MHz Phillips video A/D converter 60. A different A/D converter would result in a different half speed sampling frequency range. Half speed sampling is contemplated for use with graphics modes having DOTCLK frequencies between about 70 megahertz and about 140 megahertz.

The DOTCLK signal 24 is utilized to generate the stripe signal 26. In this regard, the DOTCLK signal 24 provides a load counter signal 29 which is input into a load counter 28. The load counter 28, having an associated counting factor, determines the characteristics of the stripe signal 26 according to the sampling speed. For full speed sampling, the counting factor is set to ⅛, while for half speed sampling the counting factor is set to ¼. In this way, test information indicative of an alternating striped pattern will be generated at both full and half speed sampling.

The output scaler 30 is provided with a voltage-controlled oscillator (VCO) signal 32, generated by a VCO 36, to generate the DOTCLK signal 24. The VCO 36 produces the VCO signal 32 according to a filter signal 38, wherein the VCO 36 is responsive to the stabilization adjustment signal 70. The filter signal 38 is generated by a loop filter 40, which operates on a phase detector signal 42 to facilitate the generation of VCO signal 32.

In order to facilitate the matching of the phase of the DOTCLK signal 24 with the phase of the HSYNC signal 14, the PLL circuit 22 further includes a phase detector 44 for generating the detector signal 42. Similar to the VCO 36, the phase detector 44 is also responsive to the stabilization adjustment signal.

The DOTCLK signal 24 is provided to the phase detector 44 by way of feedback signal 46 generated by the feedback division counter 48 having an associated feedback factor. The feedback division counter 48 is supplied with a division signal 50 representative of the DOTCLK signal 24, wherein the feedback division counter multiplies the division signal 50 by the feedback factor. For full speed sampling, the feedback factor is about 1/N. For half speed sampling, the feedback factor is about 1/(N/2). In both full and half speed sampling, the value of N is responsive to MPU 66, wherein the feedback factor can be modified according to algorithms 300 and 400.

In operation, the HSYNC signal 14 is supplied to the PLL circuit 22. The phase detector 44 operates on the HSYNC signal 14 according to the stabilization adjustment signal 70 supplied by the MPU 66, thereby producing the detector signal 42. The detector signal 42 is then manipulated by the loop filter 40 to generate the filter signal 38. Depending upon the stabilization adjustment signal 70 supplied by the MPU 66, the VCO 36 modifies the filter signal 38 to produce the VCO signal 32.

The output scaler 30 scales the VCO signal 32 to generate the DOTCLK signal 24. The DOTCLK signal 24 is then supplied to the video A/D converter 60 to facilitate the sampling of the analog signal 12, and is also supplied to the load counter 28 as the counter signal 29 to generate the stripe signal 26.

The feedback for permitting the matching of the HSYNC signal 14 with the phase of the DOTCLK signal 24 is accomplished by the feedback division counter 48. The division signal 50, which is equivalent to the DOTCLK signal 24, is supplied to the feedback division counter 48. The feedback division counter 48 modifies the frequency of the division signal 50 to produce the feedback signal 46, wherein the feedback division counter 48 multiplies the division signal 50 by 1/N in full speed sampling, or by 1/(N/2) in half speed sampling.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. In a display system having a frame buffer for supplying pixel information to a display device for displaying an image, a stabilizing apparatus comprising:

phase locked loop means coupled to the frame buffer for synchronizing the information being supplied from the frame buffer to the display device;

means for causing the storing test pattern information indicative of a test pattern image in the frame buffer during an initialization operation;

control means coupled to the frame buffer for monitoring the temporarily stored test pattern information;

said control means for comparing said test pattern information with a reference pattern information indicative of a desired stabilized image to determine whether said stored test pattern information and said reference pattern information are substantially similar to one another, wherein said control means generates a stabilization adjustment signal when said test pattern information and said reference pattern information are different from one another; and said phase locked loop means for adjusting said test pattern information in response to said stabilization adjustment signal in an attempt to make the temporarily stored information substantially similar to said reference information for image stabilization purposes so that the information being supplied from the frame buffer to the display device during normal operation is properly synchronized.

2. In a display system having a frame buffer for supplying pixel information to a display device for displaying an image, a stabilizing apparatus comprising:

phase locked loop means coupled to the frame buffer for synchronizing the information being supplied from the frame buffer to the display device;

means for causing the storing of test pattern information indicative of a test pattern image in the frame buffer during an initialization operation;

control means coupled to the frame buffer for monitoring the temporarily stored test pattern information;

said control means for comparing said test pattern information with a reference pattern information indicative of a desired stabilized image to determine whether said stored test pattern information and said reference pattern information are substantially similar to one another, wherein said control means generates a stabilization adjustment signal when said test pattern information and said reference pattern information are different from one another;

said phase locked loop means for adjusting said test pattern information in response to said stabilization adjustment signal in an attempt to make the temporarily stored information substantially similar to said reference information for image stabilization purposes so that the information being supplied from the frame buffer to the display device during normal operation is properly synchronized; and said control means includes gain adjustment signal selection means for selecting a new gain adjustment signal to vary said display signal until said test pattern information is substantially similar to said reference information.

3. A stabilizing apparatus according to claim 2, wherein said adjustment signal selection means iteratively selects said new gain adjustment signal.

4. A stabilizing apparatus according to claim 3, wherein said phase locked loop means includes a pattern generation means having an associated counter factor for generating a pattern signal to facilitate the selective sampling of a video input signal for storing temporarily said test pattern information.

5. A stabilizing apparatus according to claim 4, wherein said phase locked loop means further includes an output scaler means having an associated scaling factor for producing a dot clock signal to facilitate the generation of said pattern information, said dot clock signal being adjustable according to said gain adjustment signal to enable the synchronization of the phase and frequency of said dot clock signal with the phase and frequency of said horizontal synchronization signal, wherein said test pattern information is substantially similar to said reference information when said dot clock signal phase and frequency is synchronized with said horizontal synchronization signal phase and frequency.

6. A stabilizing apparatus according to claim 5, wherein said phase locked loop means further includes a feedback division counter means having a feedback scale factor for generating a comparison signal to facilitate the synchronization of said dot clock frequency with said horizontal synchronization signal frequency.

7. A stabilizing apparatus according to claim 6, wherein said test pattern is an alternating vertical stripe pattern, each of the vertical stripes of said vertical stripe pattern being eight horizontal pixels in width, and said vertical stripes being repeated for all horizontal pixels.

8. A stabilizing apparatus according to claim 7, wherein said sampling means is operated in a full speed sampling more when said dot clock frequency is less than a certain frequency.

9. A stabilizing apparatus according to claim 8, wherein when said counter factor is about equal to ⅛, said output scaling factor is about equal to unity, and said feedback scale factor is about equal to 1/D, where D is an even integer.

10. A stabilizing apparatus according to claim 9, wherein D is about equal to N, where N is a multiple of 8.

11. A stabilizing apparatus according to claim 10, wherein D is about equal to N+x, where x is an integer, when N is not a multiple of 8.

12. A stabilizing apparatus according to claim 8, wherein said control means is operated in a half speed sampling mode when said dot clock frequency is greater than said certain frequency.

13. A stabilizing apparatus according to claim 12, wherein said counter factor is about equal to ¼, said output scaling factor is about equal to ½, and said feedback scale factor is about equal to 2/D, where D is an even integer.

14. In a display system having a frame buffer for supplying pixel information to a display device for displaying an image, a method of stabilizing the image, comprising:

synchronizing the information being supplied from the frame buffer to the display device;

storing test pattern information indicative of a test pattern image in the frame buffer during an initialization operation;

monitoring the temporarily stored test pattern information;

comparing said test pattern information with a reference pattern information indicative of a desired stabilized image to determine whether said stored test pattern information and said reference pattern information are substantially similar to one another, wherein said stabilization adjustment signal is generated when said test pattern information and said reference pattern information are different from one another; and adjusting said test pattern information in response to said stabilization adjustment signal in an attempt to make the temporarily stored information substantially similar to said reference information for image stabilization purposes so that the information being supplied from the frame buffer to the display device during normal operation is properly synchronized.

15. A method of stabilizing a display image according to claim 14, further including iteratively selecting said new adjustment signal.

16. In a display system having a frame buffer for supplying pixel information to a display device for displaying an image, a method of stabilizing the image, comprising:

synchronizing the information being supplied from the frame buffer to the display device;

storing test pattern information indicative of a test pattern image in the frame buffer during an initialization operation;

monitoring the temporarily stored test pattern information;

comparing said test pattern information with a reference pattern information indicative of a desired stabilized image to determine whether said stored test pattern information and said reference pattern information are substantially similar to one another, wherein said stabilization adjustment signal is generated when said test pattern information and said reference pattern information are different from one another;

adjusting said test pattern information in response to said stabilization adjustment signal in an attempt to make the temporarily stored information substantially similar to said reference information for image stabilization purposes so that the information being supplied from the frame buffer to the display device during normal operation is properly synchronized; and generating a pattern signal with a pattern generation means having an associated counter factor to facilitate the selective sampling of a video input signal for storing temporarily in the buffer the test pattern information.

17. A method of stabilizing a display image according to claim 16, further including producing a dot clock signal with an output scaler means having an associated scaling factor to facilitate the generation of said pattern signal, said dot clock signal being adjustable according to said adjustment signal to enable the synchronization of the phase and frequency of said dot clock signal with the phase and frequency of said horizontal synchronization signal, wherein said test pattern information is substantially similar to said reference information when said dot clock signal phase and frequency is synchronized with said horizontal synchronization signal phase and frequency.

18. A method of stabilizing a display image according to claim 17, further including generating a comparison signal with a feedback division counter means having a feedback scale factor to facilitate the synchronization of said dot clock frequency with said horizontal synchronization signal frequency.

19. A method of stabilizing a display image according to claim 18, further including operating said system in a full speed sampling mode when said dot clock frequency is less than a certain frequency.

20. A stabilizing apparatus according to claim 19, further including operating said sampling means in a half speed sampling mode when said dot clock frequency is greater than said certain frequency.

* * * * *

UNITED STATES PATENT AND TRADEMARK OFFICE
CERTIFICATE OF CORRECTION

PATENT NO : 5,541,646
DATED : July 30, 1996
INVENTOR(S): Chen Huang

It is certified that error appears in the above-identified patent and that said Letters Patent are hereby corrected as shown below:

Column 12, line 60, delete "claim 3", and substitute therefor --claim 2--.

Signed and Sealed this

First Day of July, 1997

*Attest:*

BRUCE LEHMAN

*Attesting Officer*   *Commissioner of Patents and Trademarks*